United States Patent
Teofili et al.

(10) Patent No.: US 10,970,289 B2
(45) Date of Patent: Apr. 6, 2021

(54) METHODS AND SYSTEMS FOR RANKING SEARCH RESULTS VIA IMPLICIT QUERY DRIVEN ACTIVE LEARNING

(71) Applicant: Adobe Inc., San Jose, CA (US)

(72) Inventors: Tommaso Teofili, Rome (IT); Michael Marth, Basel (CH)

(73) Assignee: ADOBE INC., San Jose, CA (US)

( * ) Notice: Subject to any disclaimer, the term of this patent is extended or adjusted under 35 U.S.C. 154(b) by 435 days.

(21) Appl. No.: 15/160,743

(22) Filed: May 20, 2016

(65) Prior Publication Data

US 2017/0337200 A1 Nov. 23, 2017

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 9,129,008 B1 * | 9/2015 | Kuznetsov | G06F 17/30038 |
| 2012/0011117 A1 * | 1/2012 | Tong | G06F 17/30864 707/723 |
| 2012/0324004 A1 * | 12/2012 | Le | G06Q 10/00 709/204 |
| 2013/0166577 A1 * | 6/2013 | Barak | G06F 16/9535 707/754 |
| 2013/0332262 A1 * | 12/2013 | Hunt | G06Q 30/02 705/14.43 |
| 2015/0169584 A1 * | 6/2015 | Kwok | G06F 16/951 707/730 |
| 2015/0178278 A1 * | 6/2015 | Finkelstein | G06F 17/3053 707/751 |
| 2015/0286721 A1 * | 10/2015 | Voronov | G06F 17/30864 707/706 |
| 2016/0179808 A1 * | 6/2016 | De Napoli Ferreira | G06F 16/958 707/725 |
| 2016/0335704 A1 * | 11/2016 | Chin | G06Q 30/0631 |

\* cited by examiner

*Primary Examiner* — Alford W Kindred
*Assistant Examiner* — Soheila (Gina) Davanlou
(74) *Attorney, Agent, or Firm* — Kilpatrick Townsend & Stockton LLP (57) ABSTRACT

Certain embodiments involve ranking search results from an information retrieval system using user query data to provide relevant search results to users of the information retrieval system. For example, a system determines a weight factor associated with a first user that provides a query to the information retrieval system based on a type or role of the first user. The system further determines a boost factor associated with the first user based on the weight factor and a number of consecutive search queries provided by the user. The system uses the boost factor to automatically tune a ranking algorithm to adjust a rank of a search result item resulting from a search query provided by a second user.

20 Claims, 5 Drawing Sheets

METHODS AND SYSTEMS FOR RANKING SEARCH RESULTS VIA IMPLICIT QUERY DRIVEN ACTIVE LEARNING

TECHNICAL FIELD

One or more embodiments of the present disclosure relate generally to information retrieval systems. More specifically, but not by way of limitation, one or more embodiments of the present disclosure relate to systems and methods for ranking search results from an information retrieval system using user query data to provide relevant search results to users of the information retrieval system.

BACKGROUND

Search engines, database management systems, and other information retrieval systems are designed to retrieve information based on a query provided by a user. The user can provide the query as one or more terms or keywords and the information retrieval system can search various databases for search result items (e.g., documents, web pages, or other data) based on the query. The information retrieval system will often retrieve a large number of search result items based on the query, some or many of which may not be relevant to the user. The information retrieval system may apply various algorithms to rank each search result item based on a relevancy of the search result item to the user before presenting the search result items to the user. The rank of each search result item can be used to determine an order in which the search result items are presented to the user.

The ranking algorithms can be tuned (e.g., adjusted) to improve an effectiveness of the ranking algorithms in ranking search results in an order that corresponds to the relevancy of the search results to the user. However, existing methods of tuning a ranking algorithm may involve tuning the ranking algorithm using existing data or data that is manually labelled or annotated, which requires human intervention in the tuning process.

SUMMARY

Various embodiments of the present disclosure provide systems and methods for ranking search results from an information retrieval system using user query data to provide relevant search results to users of the information retrieval system. In one example, a method for ranking results of a search includes receiving, by an information retrieval system, a first query from a first user. The method further includes using a ranking algorithm to rank a first set of search results relevant to the first search query based at least in part of a relevance score of each result item, which corresponds to an order in which the result item will be displayed to the first user. The method further includes determining, by the processor, a weight factor associated with the first user based on a role or type of the first user and determining a boost factor associated with the first search query. The boost factor can be based at least partially on the weight factor associated with the first user and a number of consecutive search queries received from the first user. The method further includes receiving, by the information retrieval system, a second search query from a second user and retrieving a second set of result items relevant to the second search query. The method further includes comparing a result item in the second set of result items to the first search query received from the first user to determine whether a similarity between the result item and the first search query is above a similarity threshold (e.g., whether the result item is substantially similar to the first search query). The method also includes tuning the ranking algorithm by applying the boost factor associated with the first search query to the relevance score of the result item to boost the relevance score of the result item if the result item is substantially similar to the first search query. The boosted relevance score of the result item can be used to determine a rank of the result item among result items in the second set of result items. In this manner, a ranking algorithm can be tuned using data about a number of consecutive search queries provided by a user and a role or type of the user and the tuned ranking algorithm can adjust a relevance score of search result items provided to subsequent users without human involvement or intervention, or the use of manually created data sets.

Additional features and advantages of exemplary embodiments of the present disclosure will be set forth in the description which follows, and in part will be obvious from the description, or will be learned by the practice of such exemplary embodiments. The foregoing summary is not an extensive overview, and it is not intended to identify key elements or indicate a scope. Rather the foregoing summary identifies aspects of embodiments as a prelude to the detailed description presented below.

DETAILED DESCRIPTION

As discussed above, prior techniques for tuning a ranking algorithm used by an information retrieval system may involve using existing data or data that is manually labelled or annotated to tune the ranking algorithm, which requires human intervention in the tuning process. Embodiments are disclosed that use implicit query driven data (e.g., data associated with a query provided by a user, a number of consecutive queries provided by the user, or a type of the user providing the one or more queries) to tune a ranking algorithm. These embodiments allow the ranking algorithm to be tuned automatically without human intervention or the use of manually created data sets.

Certain embodiments of the present disclosure involve using user query data to rank search results from an information retrieval system and thereby providing relevant search results to users of the information retrieval system. An information retrieval system can include any search engine, database management system, or other system for searching for and retrieving information based on a user query. In at least some embodiments, ranking the search results includes tuning a ranking algorithm by applying a boost factor to a relevance score of a search result item to adjust a rank of the search result item. The boost factor can be based on a number of consecutive search queries provided by a user and a type of user providing the search queries or the user's role (e.g., marketer, editor, end-user, etc.). In contrast to some existing systems or methods that require human intervention or manually created data sets (e.g., AB split testing to compare different versions of ranking algorithms, machine learning techniques used to tune ranking algorithms, etc.), the disclosed systems and methods tune a ranking algorithm using implicit user data (e.g., user query data). Using user query data to tune a ranking algorithm does not require human intervention or manually created data sets and can provide more relevant search results to users of a search engine.

In some embodiments, a rank-boost application, which is executed on one or more servers (e.g., a search engine server or other server) or other suitable computing devices, tunes a ranking algorithm using data about a search query provided by a first user. Data about a type or role of the first user and the tuned ranking algorithm is used to adjust a rank of search result items provided to a subsequent user. For example, a first user provides consecutive search queries to an information retrieval system, each of which yields a set of result items based on each search query. Each result item in each set can have a relevance score (e.g., a value indicating a likely relevance of the search result item to a user based on the search query provided by the user) and the result items in each set is ranked according to the relevance score of each result item (e.g., using a ranking algorithm). The rank-boost application then determines a weight factor associated with the first user based on a type or role of the first user. As an example, the weight factor can be a certain value if the first user is a marketer or can be another value if the first user is an end-user. In this manner, the weight factor varies based on the type of user providing the search queries.

Continuing with this example, the rank-boost application also determines a boost factor for each search query received from the first user based on the weight factor and a number of consecutive search queries received from the first user. The rank-boost application uses the boost factor for each search query to tune a ranking algorithm. The ranking algorithm uses the boost factor to adjust a relevance score of a result item if a subsequent user provides a search query that is similar to a search query provided by the first user. For example, a second user can provide a search query, which may be similar to a search query provided by the first user and may yield a similar set of result items. The rank-boost application compares a result item relevant to the second user's search query with one or more queries provided by the first user, and thereby determines a similarity between the result item and the search query. Based on the similarity, the rank-boost application causes the tuned ranking algorithm to multiply a relevance score of the result item by the boost factor associated with the query provided by the first user that is similar to the result item, which can cause the search result item to have a boosted relevance score and a higher rank among the set of result items. In this manner, if a subsequent user provides a search query that is similar to a search query provided by the prior user, relevance scores of result items resulting from the search provided by the subsequent user are influenced by data about consecutive search queries provided by a prior user and data about the type or role of the prior user.

In one illustrative example, a first user provides a first search query (e.g., keywords, terms, or phrases) to the information retrieval system (e.g., a search engine). The information retrieval system searches various databases for search result items (e.g., documents, web pages, images, or other content) based on the first search query and determines a first set of search result items relevant to the first search query. The information retrieval system then uses a ranking algorithm to determine a rank of each search result item in the first set of search result items based on a relevance score of the search result item.

The information retrieval system determines, using the rank-boost application, a weight factor associated with the first user based on a type or role of the first user. For example, the rank-boost application assigns certain weight factor values to various types of users (e.g., a weight factor value of 0.5 for a user that is a marketer, a weight factor value of 0.3 for a user that is an editor, or a weight factor value of 0.1 for a user that is an end-user). The rank-boost application then determines a boost factor for the first search query based on the weight factor associated with the first user and a number of consecutive search queries provided by the first user. For example, the rank-boost application can use various algorithms or formulas to determine a value for the boost factor based on the weight factor and the number of consecutive search queries. The first user can then provide a second and third search query and the information retrieval system can determine a second and third set of search result items based on the second and third search queries in substantially the same manner as described above. In some embodiments, the rank-boost application also determines a boost factor for the second search query and a boost factor for the third search query as described above.

Subsequently, a second user provides a search query to the information retrieval system. The search query provided by the second user may be similar to the first search query, the second search query, or the third search query provided by the first user (e.g., may include substantially similar terms or keywords). The information retrieval system searches various databases for search result items based on the search query provided by the second user and determines a set of search result items relevant to the search query provided by the second user. The set of search result items may be similar to the first, second, or third set of search result items resulting from the first, second, or third search queries provided by the first user. The rank-boost application then compares a search result item in the set of search result items resulting from the search query provided by the second user to the first, second, or third search queries provided by the first user to determine a similarity between the search result item and the first, second, or third search queries. For example, the rank-boost application compares one or more terms in the search result item to one or more terms of the first search query to determine a similarity between the result item and the first search query.

In some embodiments, the rank-boost application tunes the ranking algorithm by applying the boost factor associated with the first, second, or third search queries to a relevance score of the search result item based on a similarity between the search result item and the first, second, or third search queries. For example, the rank-boost application causes the ranking algorithm to apply the boost factor to the relevance score of the search result item if a similarity between the search result item and the first, second, or third search queries is above a threshold level of similarity. As an example, the rank-boost application can cause the ranking algorithm to multiply the relevance score of the search result item by the value of the boost factor associated with the first query if the similarity between the search result item and the first search query is above the threshold level. In some embodiments, applying the boost factor to the relevance score of the search result item causes the search result item to have a boosted relevance score (e.g., a higher or increased relevance score), which can affect a rank of the search result item. In one example, increasing the relevance score of the search result item causes the search result item to have a higher rank, which causes the search result item to be moved up in the order that the search result items will be provided to the second user.

In some embodiments, the process of tuning a ranking algorithm using data about a search query provided by a user and data about a type or role of the user is iterative. For example, the rank-boost application determines a weight factor associated with the second user and determines another boost factor associated with the search query provided by the second user (e.g., based on a weight factor associated with the second user and a number of consecutive search queries provided by the second user). The rank-boost application uses the other boost factor to tune the ranking algorithm to adjust a rank of search result items provided to a third user in substantially the same manner as described above. In this manner, the boost rank application continuously tunes a ranking algorithm using data about a number of consecutive search queries provided by a user and a role or type of the user and uses the tuned ranking algorithm to adjust a relevance score of search result items provided to subsequent users. Adjusting the relevance score of search result items provided to subsequent users can allow more relevant search result items (e.g., a search result item that is similar to a search query provided by a previous user) to be higher in the order that the search result items are provided to subsequent users. In some embodiments, iterating the process can improve an efficiency with which the ranking algorithm provides relevant search result items to users of an information retrieval system.

As used herein, the term "user query data" refers to data describing or otherwise indicating characteristics of a user that has accessed an information retrieval system. Examples of user query data include a user's query text, keywords, or phrase, an identity of the user, a type or role of the user, a number of search queries provided by the user, etc.

As used herein, the term "information retrieval system" refers to any search engine, database management system, or other system for searching for and retrieving information based on a user query.

As used herein, the term "search result item" or "result item" refers to any data or information that is presentable to a user by a computing device. In some embodiments, a "search result item" or "result item" includes any data that can be retrieved by an information retrieval system. Examples include, but are not limited to, one or more digital images, digital media, audio files, electronic documents, advertisements, and multimedia presentations.

As used herein, the term "weight factor" refers to any value associated with a user (e.g., a user providing a search query to an information retrieval system) that can be used to tune a ranking algorithm as described herein.

As used herein, the term "ranking algorithm" refers to any method, process, etc. for determining a rank of a search result item.

As used herein, the term "boost factor" refers to any value that can be used to tune a ranking algorithm as described herein.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Figure 1:
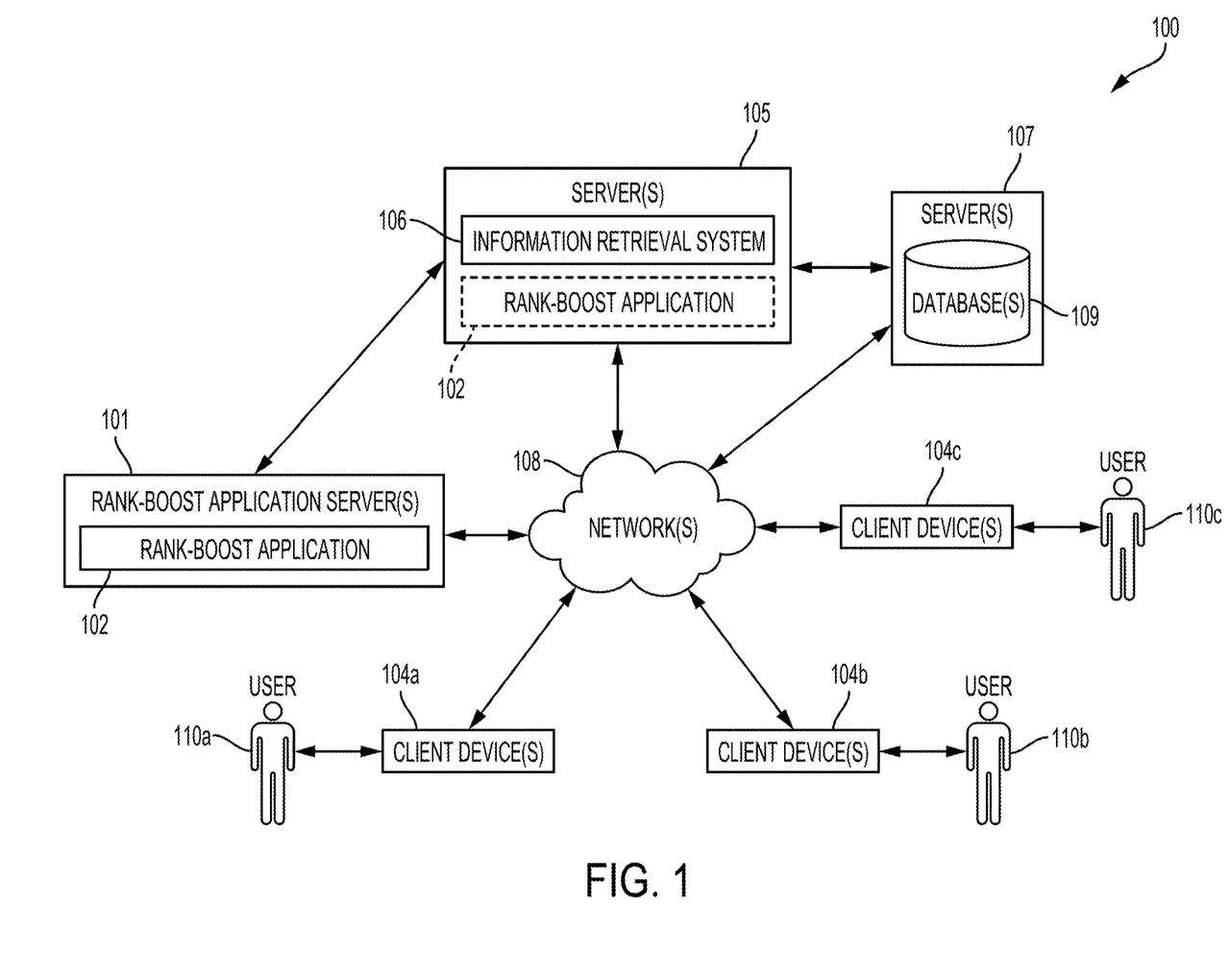
FIG. 1 is a block diagram of an exemplary environment in which a rank-boost application for tuning a ranking algorithm using user query data operates in accordance with one or more embodiments.

FIG. 1 is a block diagram of an exemplary environment 100 in which a rank-boost application 102 is executed for tuning a ranking algorithm using user query data operates. In some embodiments, the exemplary environment 100 includes the rank-boost application 102, which is executed by one or more rank-boost application servers 101 or other servers 105. The exemplary environment 100 also includes one or more client devices 104a-c, which are communicatively coupled to an information retrieval system 106 (e.g., a search engine, database management system, or other system for searching for and retrieving information based on a user query) that is executed on one or more servers 105. The client devices 104a-c can also be communicatively coupled to the rank-boost application 102 or any device in the exemplary environment 100.

The rank-boost application 102, the client devices 104a-c, and the information retrieval system 106 communicate via a network 108, which includes one or more networks or uses one or more communications platforms or technologies suitable for transmitting data or communication signals. For example, the information retrieval system 106 transmits user query data to the rank-boost application 102 via the network 108. User query data includes, but is not limited to, data about a search query provided by a user (e.g., user 110a-c), data about the user providing the search query, data about a search result item (e.g., a document, web page, or other data) resulting from a search based on the search query (e.g., identification data about the search result item or a relevance score of each search result item indicating a likely relevance of the search result item to the user based on the search query provided by the user), etc. In some embodiments, the rank-boost application 102 receives user query data from client device 104a-c, a database 109, user input (e.g., if a user programs the rank-boost application 102 to include user query data), or any other source.

In the example depicted in FIG. 1, each of the users 110a-c interfaces with a corresponding one of the client devices 104a-c to access the information retrieval system 106. Each of the users 110a-c is an individual (e.g., a human user), a business, a group, or other entity. Although FIG. 1 illustrates an exemplary environment 100 that includes three users 110a-c, the exemplary environment 100 can include any number of users.

In some embodiments, each of the client devices 104a-c represents various types of client devices. For example, one or more of the client devices 104a-c is a mobile device (e.g., a mobile telephone, a smartphone, a PDA, a tablet, a laptop, a camera, a watch, a wearable device, etc.). However, in some embodiments, one or more of the client devices 104a-c is a non-mobile device (e.g., a desktop computer or another type of client device).

In some embodiments, users 110a-c use client devices 104a-c to access the information retrieval system 106. For example, the user 110a can provide a search query to the information retrieval system 106 via the client device 104*a*. The search query can include a search term, keyword, or phrase.

The information retrieval system 106 retrieves search result items (e.g., documents, web pages, images, or other content) that correspond to the search query. In one example, the information retrieval system 106 determines and retrieves a set of search result items by accessing or searching, on one or more servers 107, one or more databases 109 that include one or more search result items. The set of search result items includes one or more search result items that may be relevant to the search query provided by the user 110*a*. The information retrieval system 106 provides the retrieved set of search result items to the user 110*a* (e.g., via the client device 104*a*).

In some embodiments, the information retrieval system 106 provides the search result items to the user 110*a* in an order based on a relevance score of each search result item in the set of search result items. For example, each search result item can be associated with a relevance score, which corresponds to value indicating a likely relevance of the search result item to the user 110*a* based on the search query provided by the user 110*a*. In some embodiments, the relevance score of a search result item is based on various factors. Example of these factors include, but are not limited to, how recently the search result item has been updated, a proximity of a term, phrase, or keyword in a search query provided by a user to the beginning of the search result item, or whether the term, phrase, or keyword is included in a title or description of the search result item, or any other factor. In some embodiments, the relevance score of a search result item is determined based on term frequency-inverse document frequency ("tf-idf") value, which is based on a number of times a term or phrase (e.g., a search query term, keyword, or phrase) appears in a search result item and a frequency of the term or phrase in search result items in the one or more databases 109 (e.g., how often the search query term, keyword or phrase appears in one or more search result items in the database 109). In some embodiments, the relevance score of a search result item can be determined using various additional and/or alternative techniques or methods.

In some embodiments, the information retrieval system 106 uses a ranking algorithm to determine a rank of each search result item based at least in part on the relevance score of each result item. For example, the information retrieval system 106 uses the ranking algorithm to determine that a search result item having a higher relevance score is ranked higher than another search result item having a lower relevance score. In some embodiments, the information retrieval system 106 provides the set of search result items to the user 110*a* in order based on the rank of each search result item and the search result items can be displayed to the user 110*a* (e.g., via the client device 104*a*) in order. In this manner, the most relevant search result item in the retrieved set of search result items is displayed first to the user 110*a*.

In some embodiments, the information retrieval system 106 collects and stores user query data as users 110*a-c* access the information retrieval system 106. As an example, if the user 110*a* provides a search query, the user 110*a* may provide a type or role of the user 110*a*. The information retrieval system 106 retrieves relevant search result items based on the search query. The information retrieval system 106 collects and stores data associated with the user 110*a* (e.g., the type or role of the user 110*a*), the search query provided by the user 110*a* (e.g., a term, keyword, or phrase in the search query), a search result item retrieved based on the search query, a relevance score of each retrieved search result item, etc.

In some embodiments, the rank-boost application 102 determines a weight factor associated with a user 110*a-c* based at least in part on a type or role of the user 110*a-c*. The weight factor is a value associated with the user 110*a-c* based on the type or role of the user 110*a-c*. In some embodiments, the rank-boost application 102 receives data corresponding to a weight factor associated with the user 110*a-c* and determines the weight factor associated with the user 110*a-c* based on data received. In some embodiments, the rank-boost application 102 receives data corresponding to a type or role of the user 110*a-c* and determines the weight factor associated with the user 110*a-c* based on the data received.

For example, the rank-boost application 102 receives data corresponding to a weight factor associated with the user 110*a* or data corresponding to a type or role of the user 110*a* from user input (e.g., if a user programs the rank-boost application 102 to include data corresponding to the weight factor or the type or role of the user 110*a*). The rank-boost application 102 determines the weight factor associated with the user 110*a* based on the user input. As another example, the rank-boost application 102 receives data corresponding to a weight factor associated with the user 110*b* or data corresponding to a type or role of the user 110*b* from a device (e.g., the client device 104*b* or another device) and determines the weight factor associated with the user 110*b* based on the data received.

As another example, the rank-boost application 102 receives data indicating that the user 110*a* is a marketer (e.g., a marketer associated with a search result item in database 109). The rank-boost application 102 determines a marketer weight factor associated with the user 110*a* and assigns the marketer weight factor to the user 110*a*. As another example, the rank-boost application 102 receives data indicating that the user 110*b* is an editor (e.g., an editor associated with a search result item in database 109). The rank-boost application 102 determines an editor weight factor associated with the user 110*b* assigns the editor weight factor to the user 110*b*. As still another example, the rank-boost application 102 receives data indicating that the user 110*c* is an end-user (e.g., an end user of the information retrieval system 106). The rank-boost application 102 determines an end-user weight factor associated with the user 110*c* and assigns the end-user weight factor to the user 110*c*. In this manner, the rank-boost application 102 determines various weight factors for each of the users 110*a-c* based on the type or role of the user.

In some embodiments, the rank-boost application 102 determines a boost factor associated with a search query provided by the user 110*a-c*. The rank-boost application 102 determines the boost factor based at least in part on a weight factor associated with the user 110*a-c* and a number of consecutive search queries provided by the user 110*a-c*. For example, the rank-boost application 102 uses various algorithms or formulas to determine a value for the boost factor for a search query provide by the user 110*a-c* based on the weight factor associated with the user 110*a-c* and the number of consecutive search queries provided by the user 110*a-c*. As an example, if the user 110*a* is a marketer and provides three consecutive search queries (e.g., a first search query, a second search query, and a third search query), the rank-boost application 102 determines a boost factor for each of the first search query, the second search query, and the third search based at least in part on the marketer weight factor and the number of consecutive search queries provided by the user 110a.

In some embodiments, the rank-boost application 102 uses the boost factor associated with a search query provided by the user 110a-c to tune a ranking algorithm such that the ranking algorithm uses the boost factor of the search query to adjust a relevance score of a search result item provided to a subsequent user providing a similar search query. As an example, if the user 110a provides the first, second, and third search query, the information retrieval system 106 determines and retrieves a set of relevant result items based on each search query (e.g., a first, second, and third set of relevant search result items based on the first, second, and third search query) and determines a rank of each search result item in the set of result items using a ranking algorithm. The user 110b provides a fourth search query to the information retrieval system 106 (e.g., via the client device 104b) after the user 110a provides the first search query, the second search query, and the third search query. The fourth search query provided by the user 110b can be similar to the first, second, or third search queries provided by the user 110a (e.g., may include substantially similar terms or keywords or a certain amount or percentage of overlapping terms). The information retrieval system 106 determines and retrieves (e.g., from the database 109) a fourth set of one or more search result items based on the fourth search query provided by the user 110b. The fourth set of search result items may be similar to the first, second, or third set of search result items based on the first, second, or third search queries provided by the user 110a. As an example, the fourth search query provided by the user 110b is similar to the first search query provided by the user 110a and the fourth set of search result items is similar to the first set of search result items resulting from the first search query provided by the user 110a. The rank-boost application 102 compares a search result item in the fourth set of search result items to the first, second, or third search queries provided by the user 110a.

In some embodiments, the rank-boost application 102 determines whether a similarity between the search result in the fourth set of search result items and the first, second, or third search queries is above or below a similarity threshold. The similarity threshold can represent a threshold level or degree of similarity between the search result item and the first, second, or third search queries. As an example, the rank-boost application 102 compares the search result item in the fourth set of search result items and the first search query to determine whether one or more terms, keywords, or phrases associated with the search result item (e.g., in a title or description of the search result item) is substantially similar to one or more terms, keywords, or phrases in the first search query. In some embodiments, the rank-boost application 102 determines that the similarity between the search result item and the first search query is above the similarity threshold if the search result item includes at least one term, keyword, or phrase that is substantially similar to a term, keyword, or phrase in the first search query.

In some embodiments, the rank-boost application 102 tunes the ranking algorithm by causing the ranking algorithm to apply the boost factor associated with the first, second, or third search queries provided by the user 110a to a relevance score of the search result item in the fourth set of search result items based at least in part on the similarity between the search result item and the first, second, or third search queries. For example, the rank-boost application 102 causes the ranking algorithm to apply the boost factor associated with the first, second, or third search queries to the relevance score of the search result item in the fourth set of search result items if the similarity between the search result item and the first, second, or third search queries is above the similarity threshold. As an example, the rank-boost application 102 causes the ranking algorithm to multiply the relevance score of the search result item by the value of the boost factor associated with the first query provided by the user 110a if the similarity between the search result item and the first search query is above the similarity threshold level (e.g., if the search result item and the first search query both include one or more substantially similar terms, keywords, or phrases). In some embodiments, applying the boost factor associated with the first query to the relevance score of the search result item causes the search result item to have a boosted relevance score (e.g., a higher or increased relevance score), which can affect a rank of the search result item. For example, increasing the relevance score of the search result item can cause the search result item to have a higher rank, which causes the search result item to be moved up in the order that the search result items will be provided to the user 110b (e.g., via the client device 104b).

In an illustrative embodiment of the present disclosure, a user 110a provides a first search query that includes the terms "foo bar" to the information retrieval system 106 via the client device 104a. The information retrieval system 106 accesses the database 109 and retrieves a first set of search result items based on a search using the first search query. In the illustrative embodiment, the first set of search result items includes a search result item entitled "foo bar what." The rank-boost application 102 receives data indicating that the user 110a is a marketer (e.g., from user input, the client device 104a, or another device). The rank-boost application determines a weight factor associated with the user 110a based on the user being a marketer. The rank-boost application 102 determines a boost factor associated with the first search query based on the weight factor associated with the user 110a and a number of consecutive search queries provided by the user 110a. Subsequently, the user 110b provides a second search query that includes the terms "foo bar" and the information retrieval system 106 accesses the database 109 and retrieves a second set of search result items based on a search using the second search query. The second set of search result items is similar to the first set of search result items since both search queries include similar terms and the second set of search result items includes the search result item entitled "foo bar what."

In the illustrative embodiment, the rank-boost application 102 compares the search result item entitled "foo bar what" to the first search query of "foo bar" to determine a similarity between the search result item and the first search query. In the illustrative embodiment, the search result item and the first search query include two substantially similar terms and the rank-boost application 102 determines that the similarity between the search result item and the first search query is above the similarity threshold. The rank-boost application 102 causes the ranking algorithm to apply the boost factor associated with the first search query to a relevance score of the search result item entitled "foo bar what."

In this manner, if a subsequent user (e.g., the user 110b or 110c) provides a search query to the information retrieval system 106 that is similar to a search query provided by a previous user (e.g., the user 110a), a relevance score of a search result item resulting from the search provided by the subsequent user is influenced by data about consecutive search queries provided by the previous user and data about the type or role of the previous user. In some embodiments, tuning a ranking algorithm using implicit user data (e.g., user query data collected and stored by the information retrieval system 106) as described above minimizes or obviates human involvement or intervention, or the use of manually created data sets to tune the ranking algorithm, which can allow the ranking algorithm to be used to provide more relevant search results to users (e.g., users 110a-c) of the information retrieval system 106.

Although the exemplary environment 100 of FIG. 1 is depicted as having a certain number of components, in other examples, the exemplary environment 100 has any number of additional or alternative components. Further, while FIG. 1 illustrates a particular arrangement of the rank-boost application 102, client devices 104a-c, information retrieval system 106, database(s) 109, and the network 108, various additional arrangements are possible. In some embodiments, the rank-boost application 102 directly communicates with the information retrieval system 106, bypassing the network 108. Furthermore, while FIG. 1 illustrates the information retrieval system 106 and the rank-boost application 102 as separate components on different servers, in some embodiments, the information retrieval system 106 and the rank-boost application 102 are part of a single system hosted on one or more servers.

Figure 2:
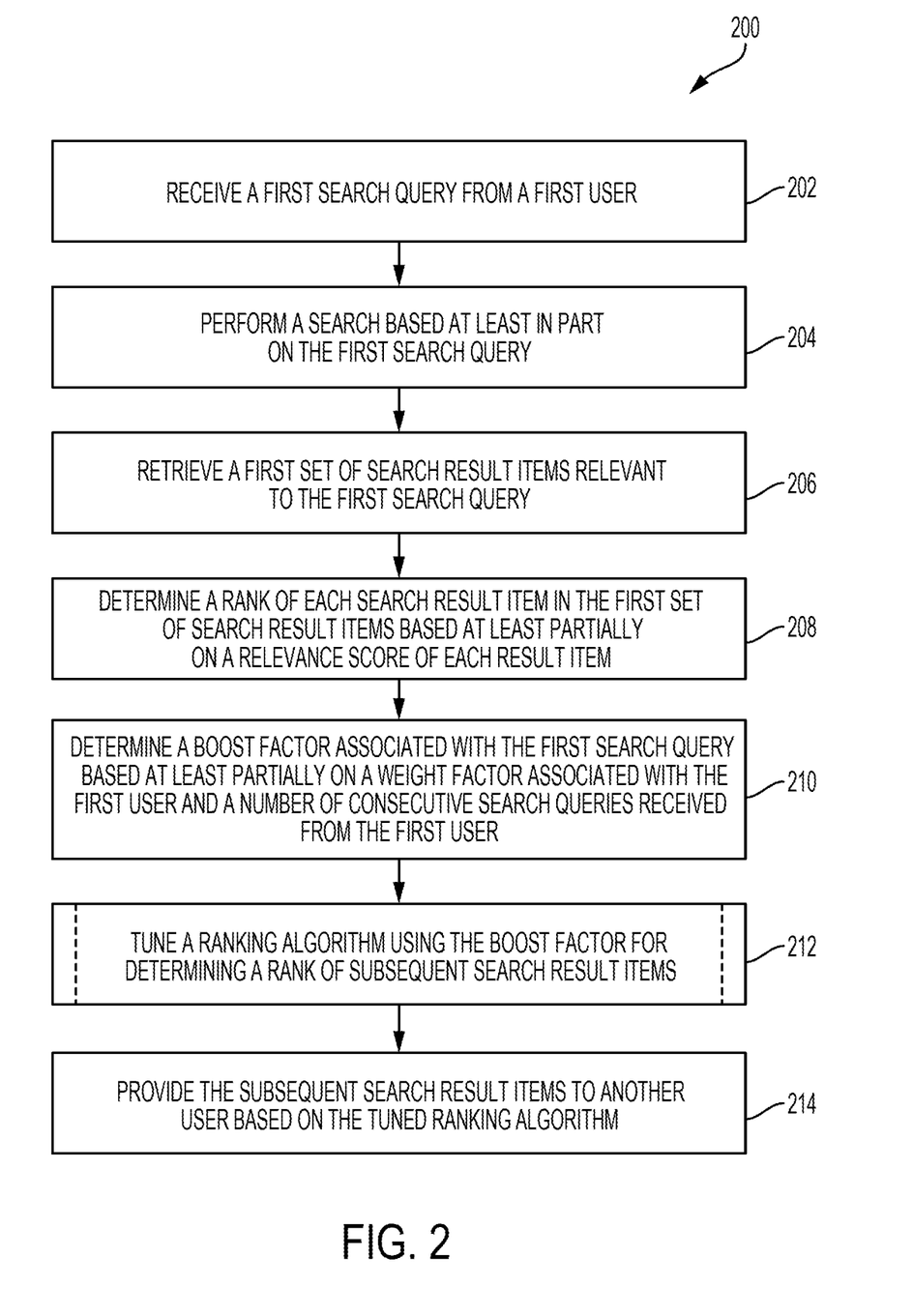
FIG. 2 is a flow chart depicting an example of a process for ranking search results from an information retrieval system using user query data to provide relevant search results to users in accordance with one or more embodiments.

FIG. 2 is a flow chart depicting an example of a process 200 for ranking search results from an information retrieval system using user query data to provide relevant search results to users. In some embodiments, one or more processing devices implement operations depicted in FIG. 2 by executing suitable program code (e.g., the rank-boost 102). For illustrative purposes, the process 200 is described with reference to the examples depicted in FIG. 1. Other implementations, however, are possible.

In block 202, a first search query is received from a first user (e.g., user 110a of FIG. 1). In some embodiments, an information retrieval system executed by a server (e.g., the information retrieval system 106 of FIG. 1) receives the first search query from the first user (e.g., via the client device 104a of FIG. 1). The first search query can include one or more keywords, terms, or phrases.

In block 204, a search based, at least in part, on the first search query is performed. In some embodiments, the information retrieval system performs the search based on the first search query. For example, the information retrieval system accesses and searches one or more databases that include one or more result items or search result items (e.g., the database 109 of FIG. 1). For example, the information retrieval system can search the database using a term, keyword, or phrase in the first search query (e.g., by searching for a search result item in the database that includes a term, keyword, or phrase that is similar to the term, keyword or phrase in the first search query). In other embodiments, the information retrieval system can perform a search based in part on the first search query using any method or technique.

In block 206, a first set of search result items relevant to the first search query is retrieved. In some embodiments, the information retrieval system retrieves the first set of search result items (e.g., from the database accessed and searched by the information retrieval system in block 204). The first set of search result items includes one or more search result items relevant to the first search query. For example, the information retrieval system can compare a search result item in the database to the first search query and retrieve the search result item based on the search result item including a term, keyword, or phrase that is similar to a term, keyword, or phrase in the first search query. In other embodiments, the information retrieval system can retrieve the first set of result items relevant to the first search query using any method or technique.

In block 208, a rank of each search result item in the first set of search result items is determined based at least in part on a relevance score of each search result item. In some embodiments, the relevance score of each search result item corresponds to value indicating a likely relevance of the search result item to the first user based on the first search query provided by the first user. The information retrieval system uses a ranking algorithm to determine the rank of each search result item based at last in part on the relevance score of each result item. For example, the ranking algorithm ranks a first search result item having a high relevance score above another search result item having a lower relevance score.

In block 210, a boost factor associated with the first search query is determined based at least partially on a weight factor associated with the first user and a number of consecutive search queries received from the first user. In some embodiments, a rank-boost application (e.g., the rank-boost application 102 of FIG. 1) determines the boost factor associated with the first search query. In some embodiments, the information retrieval system collects user query data, which can include data about the first user providing the first search query (e.g., a type or role of the first user or a number of consecutive search queries provided by the first user). The information retrieval system transmits the user query data to the rank-boost application and the rank-boost application uses the user query data to determine the boost factor associated with the first search query. In some embodiments, the rank-boost application receives the user query data from any other source (e.g., via user input, a client device 104a-c of FIG. 1, or another computing device).

In some embodiments, the rank-boost application determines the weight factor associated with the first user based at least in part on a type or role of the first user. The weight factor is a value associated with the first user based on the type or role of the first user. For example, user query data received by the rank-boost application can indicate that the first user is a marketer, an editor, or an end-user and the rank-boost application determines a corresponding marketer weight factor (e.g., 0.5), editor weight factor (e.g., 0.3), or end-user weight factor (e.g., 0.1). In some embodiments, each of the marketer weight factor, editor weight factor, or end-user weight factor can be any suitable value. In some embodiments, the rank-boost application determines the role or type of the first user and receives data indicating the weight factor associated with the first user based on the type or role of the first user. For example, the rank-boost application receives user query data and determines that the first user is a marketer. The rank-boost application receives user input corresponding to the marketer weight factor and assigns the marketer weight factor to the first user based on the user input.

In some embodiments, the rank-boost application uses one or more algorithms to determine the boost factor associated with the first query. As an example, the rank-boost application determines a value for the boost factor associated with the first query based on the following equation:

$$\text{boost factor} = OriginalQuery \wedge \left(1 + (1 + \text{weight factor}) \times \left(\frac{\text{Consecutive Search Count}}{10}\right)^{-10}\right)$$

In this formula, the original query corresponds to the first query and the consecutive search count corresponds to a number of consecutive search queries received from the first user. In this formula, a high value for a weight factor associated with the first user can have an increased impact on the boost factor value. In some embodiments, a higher number of consecutive search queries provided by the first user may also have an increased impact on the boost factor value.

In block 212, a ranking algorithm is tuned using the boost factor for determining a rank of subsequent result items. In some embodiments, the rank-boost application tunes the ranking algorithm (e.g., the ranking algorithm used in block 208 to determine the rank of each search result item) using the boost factor (e.g., the boost factor determined in block 210). In some embodiments, the rank-boost application tunes the ranking algorithm by causing the ranking algorithm to use the boost factor associated with the first search query to adjust a relevance score of a search result item provided to another user that provides a search query that is similar to the first search query. In some embodiments, in block 214, subsequent search result items are provide to the other user based on the tuned ranking algorithm.

Figure 3:
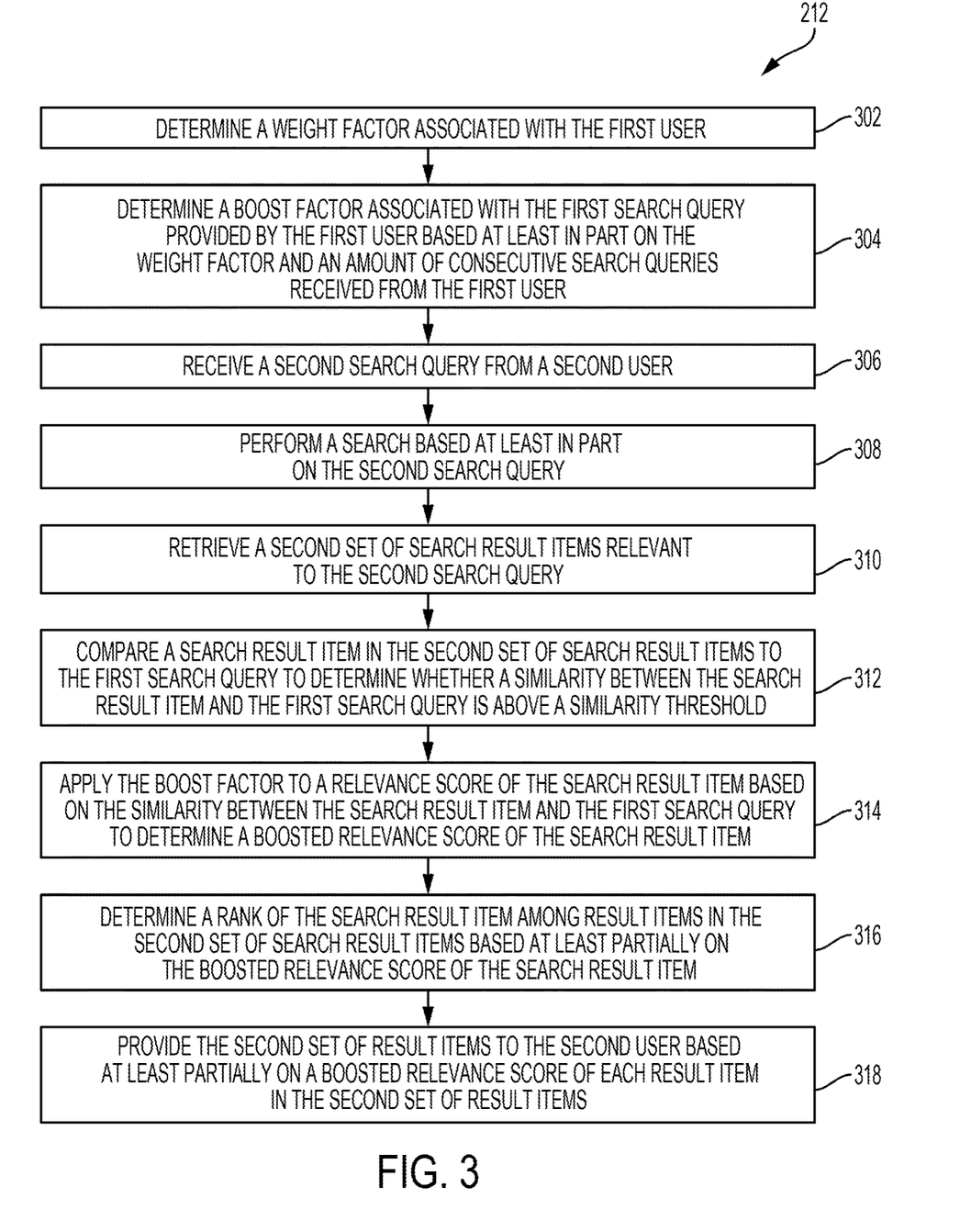
FIG. 3 is a flow chart depicting an example of a process for tuning a ranking algorithm using user query data in accordance with one or more embodiments.

FIG. 3 is a flow chart depicting an example of a process for tuning a ranking algorithm using user query data (i.e., block 212 of process 200). In some embodiments, one or more processing devices implement operations depicted in FIG. 3 by executing suitable program code (e.g., the rank-boost 102). For illustrative purposes, the process depicted in FIG. 3 is described with reference to the examples depicted in FIG. 1. Other implementations, however, are possible.

In block 302, a weight factor associated with the first user is determined. In some embodiments, the rank-boost application determines the weight factor associated with the first user (e.g., the first user of block 202) in substantially the same manner as described above with regard to block 210.

In block 304, a boost factor associated with the first search query provided by the first search user is determined based at least in part on the weight factor and an amount of consecutive search queries received from the first user. In some embodiments, the rank-boost application determines the boost factor associated with the first search query in substantially the same manner as described above with regard to block 210.

In block 306, a second search query is received from a second user (e.g., the user 110b of FIG. 1). In some embodiments, the second search query is received after the first search query is received from the first user (e.g., in block 202 of FIG. 2) and may be similar to the first search query. For example, the second search query may include one or more terms, keywords, or phrases that are substantially similar to one or more terms, keywords, or phrases in the first search query. In some embodiments, an information retrieval system executed by a server (e.g., the information retrieval system 106 of FIG. 1) receives the second search query from the second user (e.g., via the client device 104b of FIG. 1).

In block 308, a search based at least in part on the second search query is performed. In some embodiments, the information retrieval system performs the search based on the second search query. For example, the information retrieval system accesses and searches one or more databases that include one or more result items or search result items (e.g., the database 109 of FIG. 1). For example, the information retrieval system searches the database using a term, keyword, or phrase in the second search query (e.g., by searching for a search result item in the database that includes a term, keyword, or phrase that is similar to the term, keyword or phrase in the second search query). In other embodiments, the information retrieval system can perform a search based in part on the second search query using any method or technique.

In block 310, a second set of search result items relevant to the second search query is retrieved. In some embodiments, the information retrieval system retrieves the second set of search result items (e.g., from the database accessed and searched by the information retrieval system in block 308). The second set of search result items includes one or more search result items relevant to the second search query. For example, the information retrieval system can compare a search result item in the database to the second search query and retrieve the search result item based on the search result item including a term, keyword, or phrase that is similar to a term, keyword, or phrase in the second search query. In other embodiments, the information retrieval system can retrieve the second set of result items relevant to the first search query using any method or technique. In some embodiments, if the second search query is similar to the first search query provided by the first user, the second set of search result items may be similar to the first set of search result items (e.g., the first set of search result items retrieved in block 206 of FIG. 2). For example, the second set of search result items can include one or more search result items included in the first set of search result items.

In block 312, a search result item in the second set of result items is compared to the first search query (e.g., the first search query provided by the first user in block 202 of FIG. 2) to determine whether a similarity between the search result item and the first search query is above a similarity threshold. In some embodiments, the rank-boost application compares the search result item to the first search query to determine whether the similarity between the search result item and the first search query is above the similarity threshold. For example, the rank-boost application compares the search result item and the first search query to determine whether one or more terms, keywords, or phrases associated with the search result item (e.g., in a title or description of the search result item) is substantially similar to one or more keywords, terms, or phrases in the first search query. In some embodiments, if the search result item includes one or more terms, keywords, or phrases that are substantially similar to a term, keyword, or phrase in the first search query, the rank-boost application determines that the similarity between the search result item and the first search query is above the similarity threshold.

In block 314, the boost factor (e.g., the boost factor determined in block 304) is applied to a relevance score of the search result item based on the similarity between the search result item and the first search query to determine a boosted relevance score (e.g., an increased relevance score) of the search result item. In some embodiments, the rank-boost application causes a ranking algorithm (e.g., the ranking algorithm used to determine the rank of a search result item in block 208 of FIG. 2) to apply the boost factor to the relevance score of the search result item to determine the boosted relevance score. In some embodiments, the rank-boost application applies the boost factor to the relevance score of the search result item in response to determining that the similarity between the search result item and the first search result is above the similarity threshold (e.g., as determined in block 312).

In some embodiments, applying the boost factor to the relevance score of the search result item to determine the boosted relevance score includes multiplying the relevance score of the search result item by the value of the boost factor associated with the first search query (e.g., the value of the boost factor determined in block 210 of FIG. 2). As an example, if the relevance score of the search result item is 0.33 and the value of the boost factor associated with the first search query is 1.15, the rank-boost application causes the ranking algorithm to multiply the relevance score 0.33 by the value of the boost factor 1.15 to determine the boosted relevance score (e.g., an increased relevance score) of 0.3795 of the search result item.

In block 316, a rank of the search result item among search result items in the second set of search result items is determined based at least partially on the boosted relevance score of the search result item. In some embodiments, the information retrieval system uses the ranking algorithm to determine the rank of search result items in the second set of search result items. In some embodiments, boosting the relevance score of the search result item (e.g., in block 314) causes the search result item to have a higher rank among the search result items in the second set of search result items. For example, an increase in the relevance score of the search result item (e.g., the increase in the relevance score of the search result item from 0.33 to 0.3795) causes the search result item to have a higher rank among the search result items in the second set of search result items.

In block 318, the second set of result items is provided to the second user based at least partially on a boosted relevance score of each result item in the set of result items. In some embodiments, the rank-boost application is used to determine a boosted relevance score of each search result item in the second set of search result items based on a similarity between each search result item and the first search query (e.g., in block 314). In some embodiments, the information retrieval system can use the ranking algorithm to re-rank each search result item in the second set of search result items based, at least in part, on the boosted relevance score of each search result item. In some embodiments, the information retrieval system provides the second set of search result items to the second user (e.g., via the client device 104*b* of FIG. 1) in order based on the rank of each search result item that is determined based at least in part on the boosted relevance score of each search result item.

Figure 4:
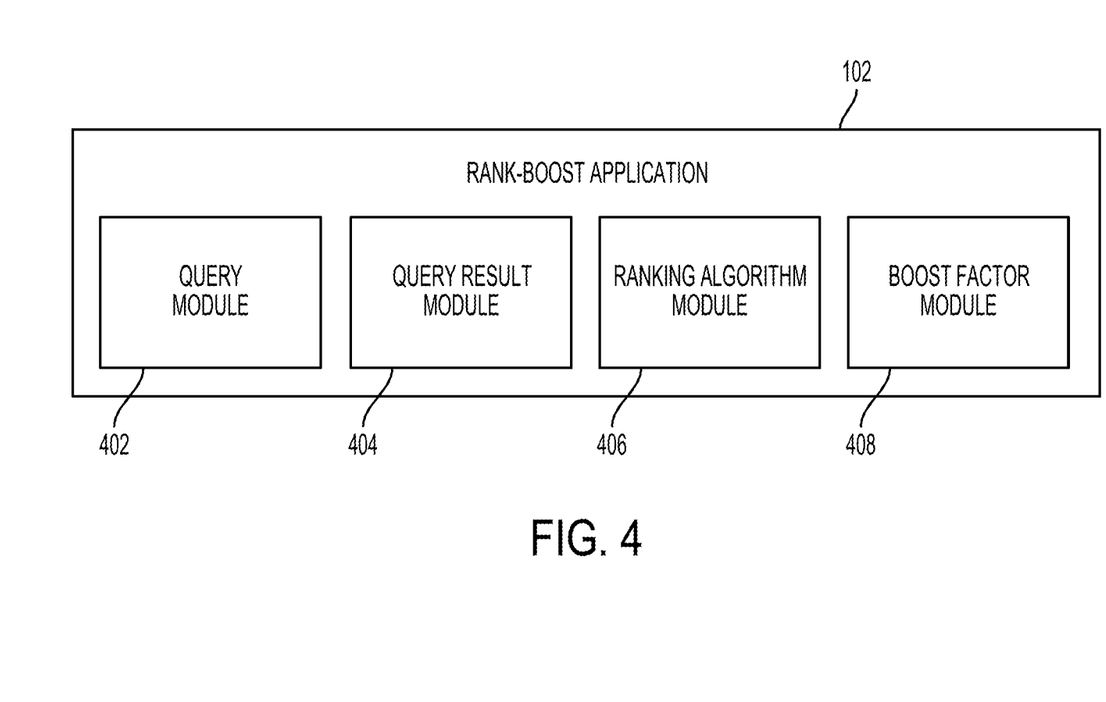
FIG. 4 is a block diagram depicting an example of various components that may be included in the rank-boost application of FIG. 1 in accordance with one or more embodiments.

FIG. 4 is a block diagram depicting an example of various components that may be included in the rank-boost application 102 of FIG. 1. In some embodiments, the rank-boost application 102 includes various modules 402, 404, 406, 408 for tuning a ranking algorithm using user query data. The modules 402, 404, 406, 408 each include one or more instructions stored on a computer-readable storage medium and executable by processors of one or more computing devices. When executed by the one or more processors, the computer-executable instructions of the rank-boost application 102 cause the rank-boost application 102 to tune a ranking algorithm as described herein. In additional or alternative embodiments, the modules 402, 404, 406, 408 include hardware, such as a special purpose processing device to perform a certain function or group of functions. Additionally or alternatively, the modules 402, 404, 406, 408 each include a combination of computer-executable instructions and hardware.

In some embodiments, the rank-boost application 102 includes a query module 402 for receiving user query data. In some embodiments, the query module 402 includes instructions for causing the rank-boost application 102 to receive user query data from an information retrieval system (e.g., the information retrieval system 106 of FIG. 1). In some embodiments, the query module 402 includes instructions for causing the rank-boost application 102 to receive user query data from other sources (e.g., client devices 104*a-c* or database 109 of FIG. 1, user input, etc.). In some embodiments, the query module 402 includes instructions for causing the rank-boost application 102 to obtain user query data from one or more sources.

In some embodiments, user query data includes data about a search query provided by a user (e.g., data about a term, keyword, or phrase in the search query). In some embodiments, user query data includes data about a role or a type of the user providing the search query. For example, user query data indicates whether the user is a marketer, editor, end-user, etc. In some embodiments, user query data includes a number of searches queries (e.g., a number of consecutive search queries) provided by the user.

In some embodiments, the rank-boost application 102 includes a query result module 404 for receiving data. In some embodiments, the query result module 404 includes instructions for causing the rank-boost application 102 to receive data from an information retrieval system (e.g., the information retrieval system 106 of FIG. 1) about one or more search result items retrieved by the information retrieval system based on a query provided by a user. For example, the data includes data about a term, phrase, or keyword associated with the search result item (e.g., in the title, description, etc. of the search result item).

In some embodiments, the rank-boost application 102 includes a ranking algorithm module 406 for receiving relevance score data. In some embodiments, the ranking algorithm module 406 includes instructions for causing the rank-boost application 102 to receive relevance score data from the information retrieval system. In some embodiments, relevance score data includes data indicating a relevance score associated with a search result item (e.g., a search result item retrieved by the information retrieval system based on a search query). For example, the relevance score can correspond to a value of the relevance score associated with the search result item. In some embodiments, the ranking algorithm module 406 includes instructions for causing the rank-boost application 102 to receive relevance score data from one or more other sources (e.g., user input, a computing device, etc.).

In some embodiments, the ranking algorithm module 406 includes instructions for causing the rank-boost application 102 to receive ranking data. In some embodiments, ranking data includes data about a how a ranking algorithm ranks one or more search result items in a set of search result items. For example, ranking data indicates how the ranking algorithm ranks each search result item in the set of search result items based on a relevance score associated with each search result item. In some embodiments, ranking data also includes a rank of each search result item in a set of search result items.

In some embodiments, the rank-boost application 102 includes a boost factor module 408 for causing the rank-boost application 102 to determine a weight factor associated with a user providing a search query (e.g., to the information retrieval system 106 of FIG. 1). In some embodiments, the boost factor module 408 includes instructions for causing the rank-boost application 102 to use data received by the rank-boost application 102 (e.g., using the query module 402) to determine the weight factor. For example, the rank-boost application 102 determines the weight factor based at least in part on a type or role of the user. In some embodiments, boost factor module 408 causes the rank-boost application 102 to determine the weight factor associated with the user in substantially the same manner as described in more detail above.

In some embodiments, the boost factor module 408 includes instructions for causing the rank-boost application 102 to determine a boost factor associated with the search query provided by the user. In some embodiments, the boost factor module 408 includes instructions for causing the rank-boost application 102 to use data received by the rank-boost application (e.g., using the query module 402) to determine the boost factor. For example, the rank-boost application 102 determines the boost factor based at least in part on the weight factor associated with the user providing the search query and a number of consecutive search queries provided by the user. In some embodiments, the boost factor module 408 causes the rank-boost application 102 to determine a boost factor associated with a search query provided by a user in substantially the same manner as described in more detail above.

In some embodiments, the boost factor module 408 includes instructions for causing the rank-boost application 102 to use the boost factor associated with the search query to tune a ranking algorithm. In some embodiments, the boost factor module 408 causes the rank-boost application to tune the ranking algorithm such that the ranking algorithm uses the boost factor to adjust a relevance score of a search result item provided to a subsequent user that provides a subsequent similar search query. For example, the boost factor module 408 includes instructions for causing the rank-boost application 102 to use data received by the rank-boost application (e.g., using the query module 402, the query result module 404, or the ranking algorithm module 406) to tune the ranking algorithm. As an example, the boost factor module 408 includes instructions for causing the rank-boost application 102 to compare a search result item resulting from a subsequent search to a prior search query provided by a prior user (e.g., compare the search result item to a prior search query to determine whether one or more terms, keywords, or phrases associated with the search result item is substantially similar to one or more terms, keywords, or phrases in the prior search query). In some embodiments, the boost factor module 408 includes instructions for causing the rank-boost application 102 to cause the ranking algorithm to apply a boost factor associated with the prior search query to the relevance score of the search result item if the search result item includes at least one term, keyword, or phrase that is substantially similar to a term, keyword, or phrase in the prior search query. In some embodiments, applying the boost factor associated with the prior search query to the relevance score of a search result item resulting from a subsequent search query can cause the search result item to have a boosted relevance score (e.g., a higher or increased relevance score), which can affect a rank of the search result item. For example, increasing the relevance score of the search result item can cause the search result item to have a higher rank, which causes the search result item to be moved up in the order that the search result item will be provided to the subsequent user.

In some embodiments, the boost factor module 408 can cause the rank-boost application 102 to tune a ranking algorithm such that if a subsequent user provides a search query to an information retrieval system that is similar to a search query provided by a prior user, a relevance score of a search result item resulting from the search query provided by the subsequent user is influenced by data about consecutive search queries provided by the prior user and data about the type or role of the prior user. In some embodiments, the boost factor module 408 causes the rank-boost application to tune the ranking algorithm in substantially the same manner as described in more detail above.

Figure 5:
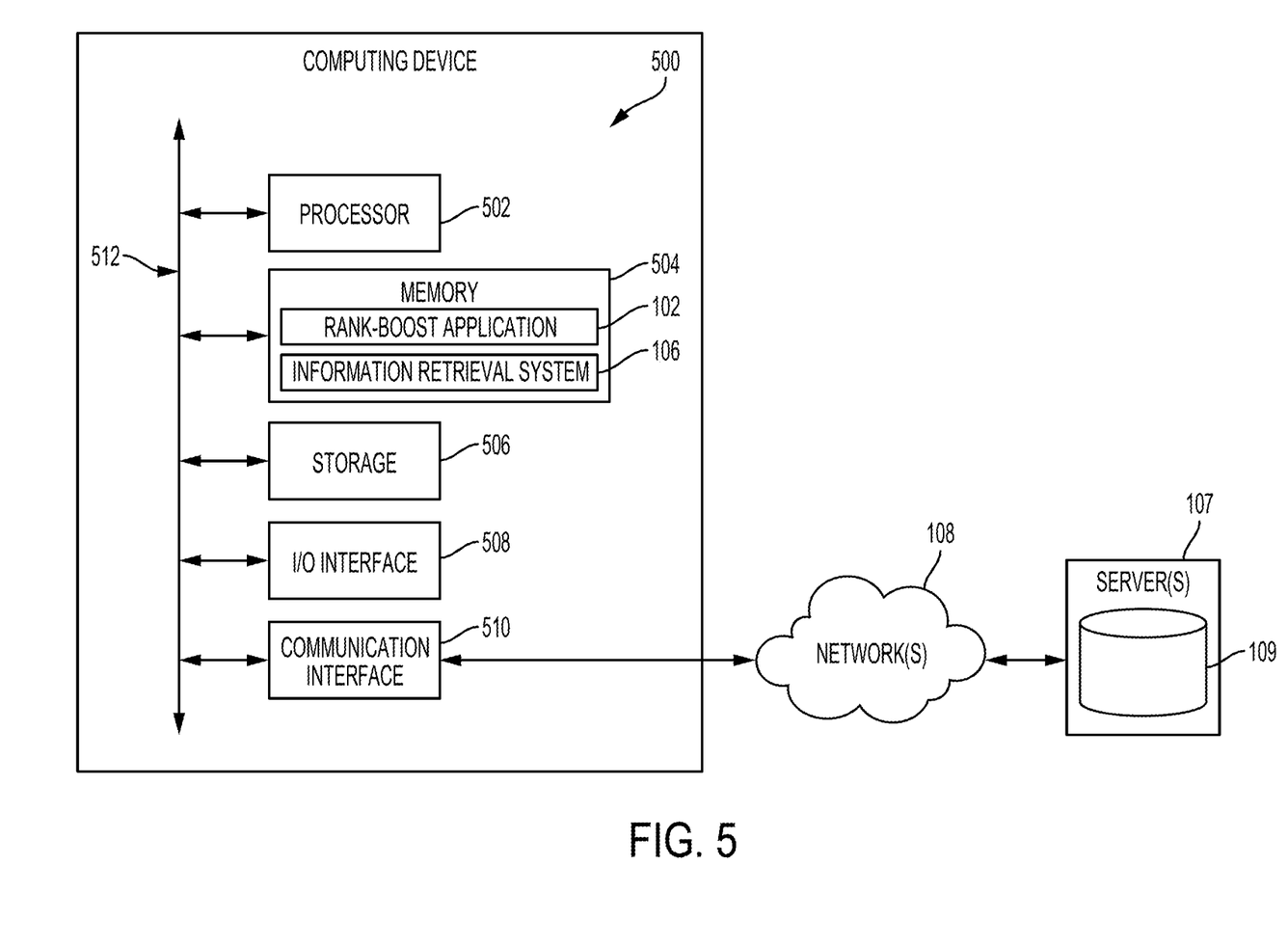
FIG. 5 is a block diagram of an exemplary computing device that may be used for executing computer-executable program code of a rank-boost application for tuning a ranking algorithm using user query data in accordance with one or more embodiments.

FIG. 5 is a block diagram of an exemplary computing device 500 that may be used for executing computer-executable program code of a rank-boost application for tuning a ranking algorithm using user query data in accordance with one or more embodiments. In some embodiments, one or more computing devices, such as the computing device 500 implement an information retrieval system (e.g., the information retrieval system 106 of FIG. 1) or a rank-boost application (e.g., the rank boost application 102 of FIG. 1). In the example depicted in FIG. 5, the computing device 500 includes a processor 502, memory 504, a storage device 506, an I/O interface 508, and a communication interface 510, which is communicatively coupled by way of a communication infrastructure 512. While an exemplary computing system 500 is shown in FIG. 5, the components illustrated in FIG. 5 are not intended to be limiting. In some embodiments, additional or alternative components are used. Furthermore, in some embodiments, the computing device 500 includes fewer components than those shown in FIG. 5. Components of the computing device 500 shown in FIG. 5 will now be described in additional detail.

In some embodiments, the processor 502 includes hardware for executing instructions, such as those making up a computer program. As an example and not by way of limitation, the processor 502 retrieves or fetches the instructions from an internal register, an internal cache, the memory 504, or the storage device 506. The processor 502 then decodes and executes the instructions after retrieving the instructions. In some embodiments, the processor 502 includes one or more internal caches for data, instructions, or addresses. As an example and not by way of limitation, the processor 502 includes one or more instruction caches, one or more data caches, and one or more translation lookaside buffers ("TLBs"). In some embodiments, instructions in the instruction caches are copies of instructions in the memory 504 or the storage device 506.

In some embodiments, the memory 504 is used for storing data, metadata, and programs for execution by the processor(s). In some embodiments, the memory 504 includes one or more of volatile and non-volatile memories, such as Random Access Memory ("RAM"), Read Only Memory ("ROM"), a solid state disk ("SSD"), Flash, Phase Change Memory ("PCM"), or other types of data storage. In some embodiments, the memory 504 is internal or distributed memory. In some embodiments, the memory includes various modules for tuning a ranking algorithm using user query data. For example, in some embodiments, the memory 504 includes a rank-boost application 102 or the information retrieval system 106. In some embodiments, the memory 504 includes various modules (e.g., the modules 402, 404, 406, 408 of FIG. 4).

The storage device 506 includes storage for storing data or instructions. As an example and not by way of limitation, the storage device 506 includes a non-transitory storage medium described above. In some embodiments, the storage device 506 includes a hard disk drive ("HDD"), a floppy disk drive, flash memory, an optical disc, a magneto-optical disc, magnetic tape, or a Universal Serial Bus ("USB") drive or a combination of two or more of these. In some embodiments, the storage device 506 includes removable or non-removable (or fixed) media, where appropriate. In some embodiments, the storage device 506 is internal or external to the computing device 500. In particular embodiments, the storage device 506 is non-volatile, solid-state memory. In other embodiments, the storage device 506 includes read-only memory ("ROM"). Where appropriate, this ROM is mask programmed ROM, programmable ROM ("PROM"), erasable PROM ("EPROM"), electrically erasable PROM ("EEPROM"), electrically alterable ROM ("EAROM"), or flash memory, or a combination of two or more of these.

The I/O interface 508 allows a user to provide input to, receive output from, and otherwise transfer data to and receive data from the computing device 500. In some embodiments, the I/O interface 508 includes a mouse, a keypad or a keyboard, a touch screen, a camera, an optical scanner, network interface, modem, other known I/O devices or a combination of such I/O interfaces. In some embodiments, the I/O interface 508 includes one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 508 is configured to provide graphical data to a display for presentation to a user. In some embodiments, the graphical data is representative of one or more graphical user interfaces or any other graphical content to serve a particular implementation.

The communication interface 510 includes hardware, software, or both. In some embodiments, the communication interface 510 provides one or more interfaces for communication (such as, for example, packet-based communication) between the computing device 500 and one or more other computing devices, servers 107, or networks 108. As an example and not by way of limitation, the communication interface 510 includes a network interface controller ("NIC") or network adapter for communicating with an Ethernet or other wire-based network or a wireless NIC ("WNIC") or wireless adapter for communicating with a wireless network, such as a WI-FI.

Additionally or alternatively, the communication interface 510 facilitates communications with an ad hoc network, a personal area network ("PAN"), a local area network ("LAN"), a wide area network ("WAN"), a metropolitan area network ("MAN"), or one or more portions of the Internet or a combination of two or more of these. One or more portions of one or more of these networks are wired or wireless. As an example, the communication interface 510 facilitates communications with a wireless PAN ("WPAN") (such as, for example, a BLUETOOTH WPAN), a WI-FI network, a WI-MAX network, a cellular telephone network (such as, for example, a Global System for Mobile Communications ("GSM") network), or other suitable wireless network or a combination thereof.

Additionally, the communication interface 510 facilitates communications with various communication protocols. Examples of communication protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

In some embodiments, the communication infrastructure 512 includes hardware, software, or both that couples components of the computing device 500 to each other. As an example, and not by way of limitation, the communication infrastructure 512 includes an Accelerated Graphics Port ("AGP") or other graphics bus, an Enhanced Industry Standard Architecture ("EISA") bus, a front-side bus ("FSB"), a HYPERTRANSPORT ("HT") interconnect, an Industry Standard Architecture ("ISA") bus, an INFINIBAND interconnect, a low-pin-count ("LPC") bus, a memory bus, a Micro Channel Architecture ("MCA") bus, a Peripheral Component Interconnect ("PCI") bus, a PCI-Express ("PCIe") bus, a serial advanced technology attachment ("SATA") bus, a Video Electronics Standards Association local ("VLB") bus, or another suitable bus, or a combination thereof.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A method for iteratively ranking results of a search using an information retrieval system, the method including operations performed by one or more processors, the operations comprising:

receiving, by a rank-boost application and from the information retrieval system, first user query data that identifies a relevance score of each search result item in a first set of search result items that are based on a first search query provided by a first user;

determining, by the rank-boost application and based on a first role of the first user indicated by the first user query data, a weight factor associated with the first role of the first user, wherein the first role of the first user is associated with an item in the first set of search result items;

determining, by the rank-boost application, a first boost factor associated with the first search query based at least partially on the first role associated with the weight factor and a number of consecutive search queries provided by the first user;

receiving, by the rank-boost application and from the information retrieval system, second user query data that identifies a second relevance score of each search result item in a second set of search result items that are based on a second search query provided by a second user;

determining, by the rank-boost application, a second boost factor associated with the second search query based at least partially on a second role of the second user;

determining, by the rank-boost application, that a similarity between the first search query from the first user, the second search query from the second user, and a result item in a subsequent set of search result items that are based on a subsequent search query provided by an additional user is above a similarity threshold;

responsive to determining that the similarity is above the similarity threshold, adjusting, by the rank-boost application, an additional relevance score of the result item by applying the first boost factor to the second relevance score and the second boost factor to the additional relevance score to obtain a boosted relevance score of the result item, wherein the boosted relevance score of the result item determines a rank of the result item among result items in the subsequent set of search result items; and providing, by the rank-boost application and to the information retrieval system, the boosted relevance score of the result item in the subsequent set of search result items.

2. The method of claim 1, wherein determining that the similarity between the result item in the subsequent set of search result items and the first search query is above the similarity threshold includes:

comparing the result item to the first search query to determine that the result item includes at least one term that is substantially similar to a term in the first search query.

3. The method of claim 1, wherein determining the weight factor includes:

determining, by the rank-boost application, a type of the first user; and determining, by the rank-boost application, the weight factor based at least partially on the type of the first user.

4. The method of claim 3, wherein determining the type of the first user includes receiving, by the rank-boost application, data indicating the type of the first user and determining the type of the first user based on the received data.

5. The method of claim 1, further comprising:

determining, by the rank-boost application and for each respective result item in the subsequent set of search result items, a respective boosted relevance score by applying the first boost factor to the respective relevance score of the respective result item based on a similarity between the respective result item and the first search query being above the similarity threshold; and providing, by the rank-boost application, the subsequent set of search result items to the additional user based on the boosted relevance score of each respective result item.

6. The method of claim 1, wherein adjusting the additional relevance score of the result item includes increasing the additional relevance score of the result item and wherein the boosted relevance score improves the rank of the result item among result items in the subsequent set of search result items.

7. The method of claim 1, wherein:

the first role of the first user is included in the first user query data, and the weight factor is assigned to the first user.

8. The method of claim 1, further comprising:

iteratively adjusting the additional relevance score of the result item based on the first boost factor and the second boost factor.

9. A system comprising:

a processing device executing program code of a rank-boost application; and a non-transitory computer-readable medium communicatively coupled to the processing device, wherein the processing device is configured to perform operations comprising:

receiving, from an information retrieval system, first user query data that identifies a relevance score of each search result item in a first set of search result items that are based on a first search query provided by a first user;

determining, based on a first role of the first user indicated by the first user query data, a weight factor associated with the first role of the first user, wherein the first role of the first user is associated with an item in the first set of search result items;

determining a first boost factor associated with the first search query based at least partially on the first role associated with the weight factor and a number of consecutive search queries provided by the first user;

receiving, from the information retrieval system, second user query data that identifies a second relevance score of each search result item in a second set of search result items that are based on a second search query provided by a second user;

determining, by the rank-boost application, a second boost factor associated with the second search query based at least partially on a second role of the second user;

determining that a similarity between the first search query from the first user, the second search query from the second user, and a result item in a subsequent set of search result items that are based on a subsequent search query provided by an additional user is above a similarity threshold; and responsive to determining that the similarity is above the similarity threshold, adjusting an additional relevance score of the result item by applying the first boost factor to the second relevance score and the second boost factor to the additional relevance score to obtain a boosted relevance score of the result item, wherein the boosted relevance score of the result item determines a rank of the result item among result items in the subsequent set of search result items; and providing, to the information retrieval system, the boosted relevance score of the result item in the subsequent set of search result items.

10. The system of claim 9, wherein the processing device is further configured to determine that the similarity between the result item in the subsequent set of search result items and the first search query is above the similarity threshold by:

comparing the result item to the first search query to determine that the result item includes at least one term that is substantially similar to a term in the first search query.

11. The system of claim 9, wherein the processing device is further configured to determine the weight factor associated with the first user by:

determining a type of the first user; and determining the weight factor based at least partially on the type of the first user.

12. The system of claim 11, wherein determining the type of the first user includes receiving data indicating the type of the first user and determining the type of the first user based on the received data.

13. The system of claim 11, wherein the type of the first user includes a marketer, an editor, or an end-user of the information retrieval system.

14. The system of claim 9, wherein the processing device is further configured to:
determine, for each respective result item in the subsequent set of search result items, a respective boosted relevance score by applying the first boost factor to the respective relevance score of the respective result item based on a similarity between the respective result item and the first search query being above the similarity threshold; and
provide the subsequent set of searh result items to the additional user based on the boosted relevance score of each respective result item.

15. The system of claim 9, wherein adjusting the additional relevance score of the result item includes increasing the additional relevance score of the result item and wherein the boosted relevance score improves the rank of the result item among result items in the subsequent set of search result items.

16. A non-transitory computer-readable medium storing program code executable by a processor for iteratively ranking results of a search using an information retrieval system, the program code comprising:
program code for receiving, by the processor and from the information retrieval system, first user query data that identifies a relevance score of each search result item in a first set of search result items that are based on a first search query provided by a first user;
program code for determining, by the processor and based on a first role of the first user indicated by the first user query data, a weight factor associated with the first role of the first user, wherein the first role of the first user is associated with an item in the first set of search result items;
program code for determining, by the processor, a first boost factor associated with the first search query based at least partially on the first role associated with the weight factor and a number of consecutive search queries provided by the first user;
program code for receiving, by the processor and from the information retrieval system, second user query data that identifies a second relevance score of each search result item in a second set of search result items that are based on a second search query provided by a second user;
program code for determining, by the processor, a second boost factor associated with the second search query based at least partially on a second role of the second user;
program code for determining, by the processor, that a similarity between the first search query, the second search query from the second user, and a result item in a subsequent set of search result items that are based on a subsequent search query provided by an additional user from the first user is above a similarity threshold; and
program code for adjusting, by the processor and responsive to determining that the similarity is above the similarity threshold, an additional relevance score of the result item by applying the first boost factor to the second relevance score and the second boost factor to the additional relevance score to obtain a boosted relevance score of the result item, wherein the boosted relevance score of the result item determines a rank of the result item among result items in the subsequent set of search result items; and
providing, by the processor and to the information retrieval system, the boosted relevance score of the result item in the subsequent set of search result items.

17. The non-transitory computer-readable medium of claim 16, wherein determining that the similarity between the result item in the subsequent set of search result items and the first search query is above the similarity threshold includes comparing, by the processor, the result item to the first search query to determine that the result item includes at least one term that is substantially similar to a term in the first search query.

18. The non-transitory computer-readable medium of claim 16, wherein the first role of the first user includes a marketer role or an editor role of the information retrieval system, and the marketer role or the editor role is associated with the item in the first set of search result items.

19. The non-transitory computer-readable medium of claim 16, wherein the program code further comprises:
program code for determining, by the processor and for each respective result item in the subsequent set of search result items, a respective boosted relevance score by applying the first boost factor to the respective relevance score of the respective result item based on a similarity between the respective result item and the first search query being above the similarity threshold; and
program code for providing, by the processor, the subsequent set of search result items to the additional user based on the boosted relevance score of each respective result item.

20. The non-transitory computer-readable medium of claim 16, wherein adjusting the additional relevance score of the result item includes increasing the additional relevance score of the result item and wherein the boosted relevance score improves the rank of the result item among result items in the subsequent set of search result items.

* * * * *